United States Patent [19]
Saito et al.

[11] 3,857,011
[45] Dec. 24, 1974

[54] METHOD AND APPARATUS FOR CONTROLLING ELECTRICAL DISCHARGE SHAPING

[75] Inventors: Nagao Saito; Kazuhiko Kobayashi; Naokazu Tomimoto, all of Nagoya, Japan

[73] Assignee: Mitsubishi Denki Kabushiki Kaisha, Tokyo, Japan

[22] Filed: Sept. 27, 1973

[21] Appl. No.: 401,141

[30] Foreign Application Priority Data
Sept. 30, 1972 Japan.............................. 47-98386

[52] U.S. Cl.............. 219/69 P, 219/69 C, 219/69 M
[51] Int. Cl............................................. B23p 1/08
[58] Field of Search..... 219/69 C, 69 G, 69 P, 69 M

[56] References Cited
UNITED STATES PATENTS
2,835,785  5/1958  Williams............................ 219/69 P
3,705,287  12/1972  Saito et al. ........................ 219/69 P Primary Examiner—Bruce A. Reynolds
Attorney, Agent, or Firm—Oblon, Fisher, Spivak, McClelland & Maier

[57] ABSTRACT

A method and apparatus for electrical discharge shaping a workpiece by applying a pulse voltage across a working gap between a workpiece and an electrode, wherein a no-load time interval before applying the voltage across the working gap to generate the discharge which is dependent upon the working condition in the working gap is detected and a quiescent time interval is controlled as a function of the no-load time.

In the method of the invention, a voltage waveform is divided into a plurality of time intervals so as to stepwise control the no-load time interval before applying the voltage to generate the discharge. Accordingly, electrical discharge shaping can be performed optimally without requiring a manual adjustment by an operator, so that working efficiency is greatly improved.

5 Claims, 7 Drawing Figures

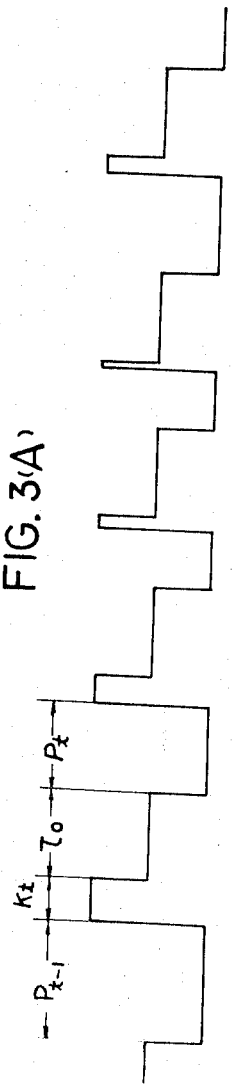
FIG. 3(A)
FIG. 3(B)
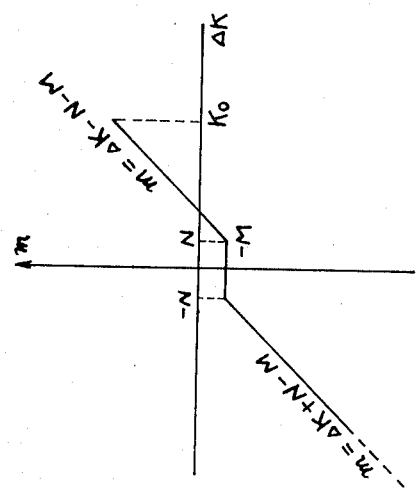
FIG. 4

METHOD AND APPARATUS FOR CONTROLLING ELECTRICAL DISCHARGE SHAPING

BACKGROUND OF THE INVENTION

1. Field of the Invention

The present invention generally relates to a method and apparatus for controlling electrical discharge shaping and more particularly to a unique method and apparatus for controlling electrical discharge shaping by applying a pulsed voltage across a working gap between a workpiece and an electrode, wherein a quiescent time interval is controlled as a function of a no-load time, whereby electrical discharge shaping efficiency is greatly improved.

2. Description of the Prior Art

In the past, it was well known that as regards factors in determining pulse conditions for electrical discharge shaping, peak value of discharge current, pulse width and quiescent time interval are important parameters. The peak value of discharge current and the pulse width directly affect discharge shaping characteristics such as smoothness of a processed surface, rate of electrode consumption, clearance, and the like. On the other hand, the quiescent time interval affects the working efficiency. In a practical operation, the peak value of discharge current and pulse width were directly determined from the working data of the apparatus before an operation. In the past, however, the quiescent time interval was determined as desired before the operation from experience which included knowledge of how much the quiescent time interval could be decreased by working conditions such as electrode, workpiece, shape of electrode, working depth, supply of a working solution, etc; with respect to how much the working efficiency could be increased. When the quiescent time interval was correctly determined, a duty factor became high and the average working current increased whereby the working efficiency was usually improved. However, if the quiescent time interval was too short, an abnormal discharging condition often resulted and could cause an accident.

Although electrical discharge shaping in the past was somewhat satisfactory, it was difficult to determine a suitable quiescent time and also it was difficult to prevent an abnormal discharge, even when a suitable quiescent time had been once determined.

SUMMARY OF THE INVENTION

Accordingly, one object of the present invention is to provide a new and improved unique method and apparatus for electrical discharge shaping a workpiece by applying a pulse voltage across a working gap between a workpiece and an electrode wherein a no-load time interval before applying the voltage across the working gap to generate the diischarge, is detected and a quiescent time interval is controlled as a function of the no-load time.

It is another object of the present invention to provide a new and improved unique method and apparatus for controlling an electrical discharge shaping by detecting a no-load time interval before applying a voltage across a working gap to generate discharge and then controlling a duty factor as a function of the no-load time interval.

It is yet another object of the present invention to provide a new and improved unique method and apparatus for controlling an electrical discharge shaping by dividing the voltage waveform applying across a working gap into a plurality of time intervals and then stepwise controlling the quiescent time interval before applying voltage to generate a discharge by detecting the time interval including the quiescent time interval. The basis of an embodiment of the last object above is disclosed in our prior U.S. application Ser. No. 364,420 filed on May 29, 1973, now U.S. Pat. No. 3,825,715.

Briefly, in accordance with this invention, the foregoing and other objects are in one aspect attained by providing a unique method and apparatus for electrical discharge shaping a workpiece by controlling the discharge pulse characteristics as a function of the no-load time.

BRIEF DESCRIPTION OF THE DRAWINGS

A more complete appreciation of the invention will be readily obtained as the same becomes better understood by reference to the following detailed description when considered in connection with the accompanying drawings, wherein:

FIGS. 3A and 3B are waveforms of pulses in the operation of the present invention;

FIG. 4 is a graph comparing no-load voltage time interval with a factor as determined in Example 1;

DETAILED DESCRIPTION OF THE PREFERRED EMBODIMENT

Figure 1:
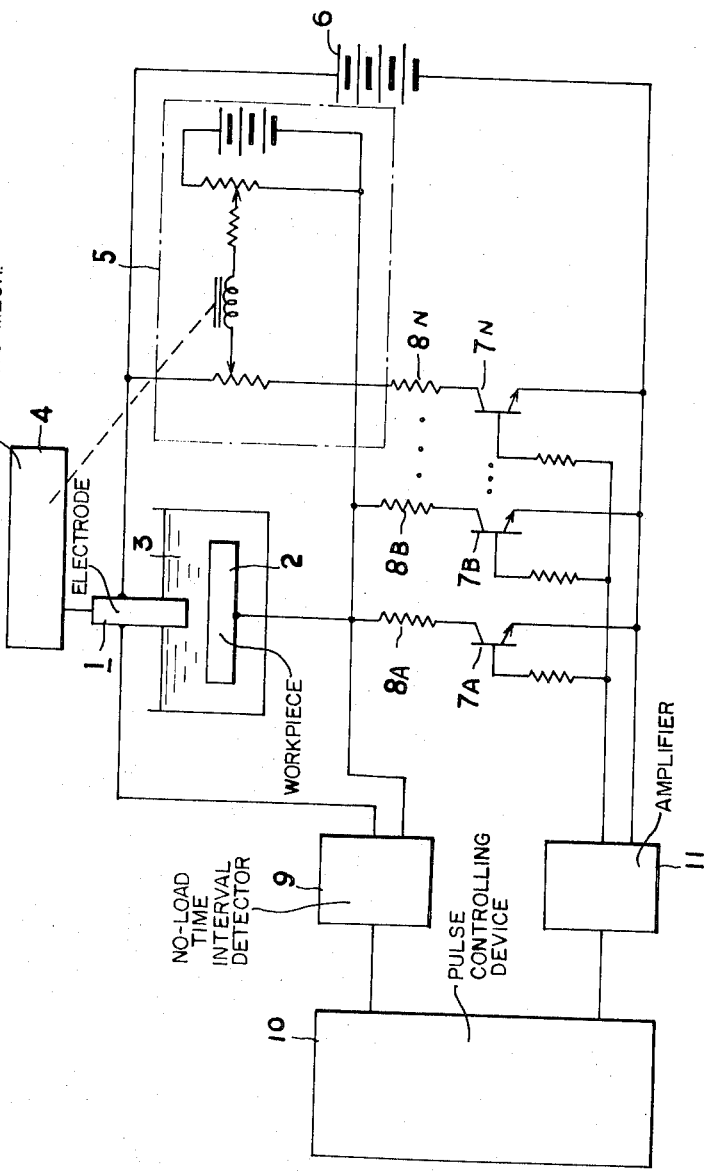
FIG. 1 is a schematic diagram of an electrical discharge shaping apparatus according to the present invention.

Referring now to the drawings, wherein like reference numerals designate identical, or corresponding parts throughout the several views, and more particularly to FIG. 1 one preferred embodiment of the electrical discharge shaping apparatus of the present invention is shown wherein an electrode 1 of an electrical discharge shaping apparatus faces a workpiece 2 through a working gap and is dipped into an insulation oil 3 such as kerosene. The apparatus comprises a hydraulic servo mechanism 4 which always controls the width of the working gap between the electrode 1 and the workpiece 2 to a predetermined amount. The servo is connected to an electrical circuit 5 and a DC power source 6 which supplies a discharge current to the working gap. A plurality of transistors 7A, 7B . . . 7N generate square wave pulses by intermittently supplying a discharge current passing across the working gap. A plurality of resistors 8A 8B . . . 8N limit the collector current of the transistors to within a rated range and also balance the currents. A device 9 detects the no-load time interval of pulses between the electrode 1 and the workpiece 2; and a pulse controlling device 10 controls a quiescent time interval as a predetermined function of the no-load time interval detected by the device 9. An amplifier 11 amplifies the output of the pulse controlling device 10 in order to supply square wave current to the bases of the transistors 7A, 7B . .

7N. A detail of the pulse controlling device 10 wherein a quiescent time $P_t$ is controlled as a function of a no-load time interval $K_t$ detected by the detecting device 9, will now be illustrated with the aid of FIG. 2.

Figure 2:
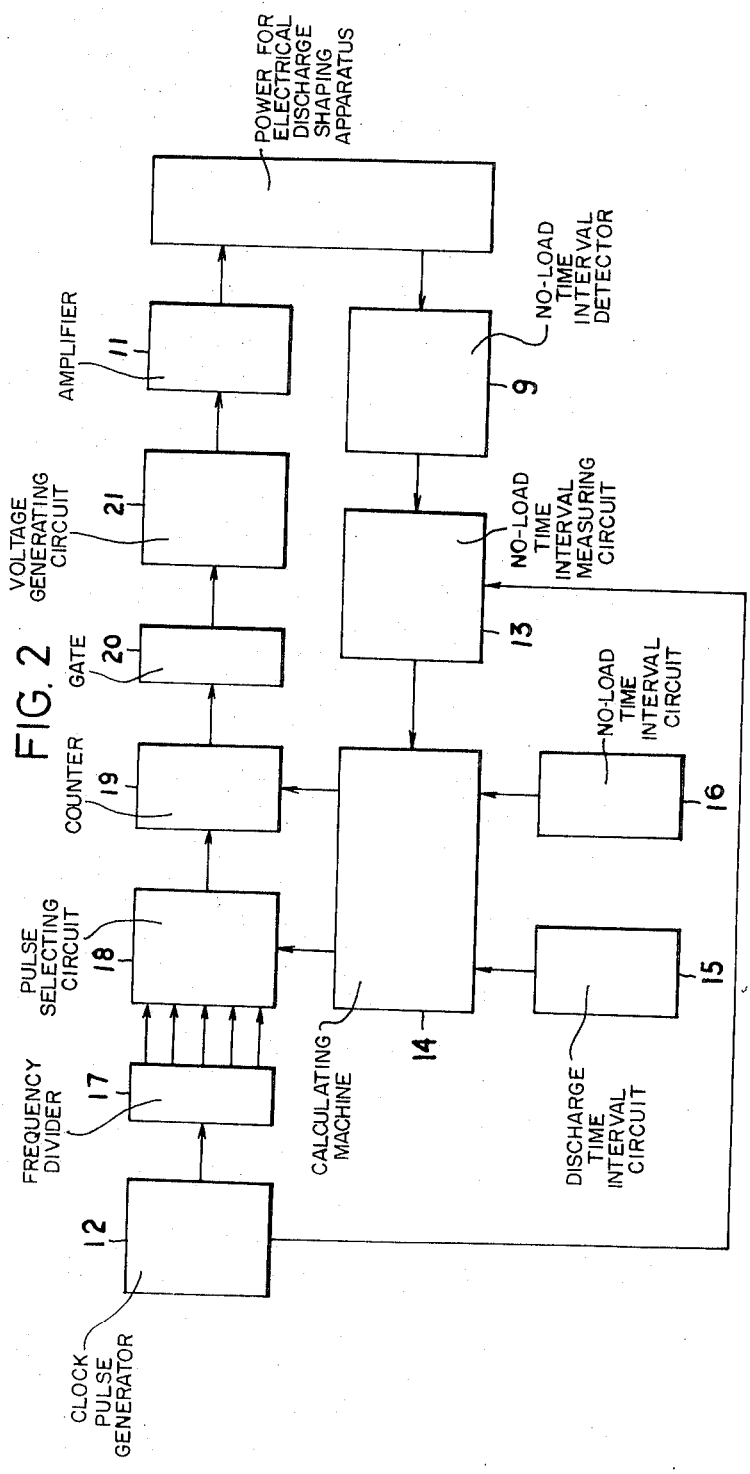
FIG. 2 is a block diagram of a pulse controlling apparatus.

In FIG. 2, the no-load time interval $K_t$, detected by the no-load time interval detecting circuit 9, is measured within a predetermined sampling time interval by a no-load time interval measuring circuit 13 which employs a clock pulse developed by a clock pulse generator 12. The measured value is stored in a calculating machine 14. Of course, if desired, it is possible to employ a sequence controlling device having simple operators instead of the calculating machine 14.

The reference numerals 15 and 16 designate respectively circuits for determining a discharge time interval $\tau_0$ and a no-load time interval $K_0$ which are basic references generally determined by an operator. A derived quiescent time interval $P_t$ is developed by the calculating machine 14 programmed with a predetermined function with the values of the set points $\tau_0$ and $K_0$ and the measured no-load time interval $K_t$. The clock pulses developed by the clock pulse generator 12 are divided by a frequency divider 17, while the quiescent time interval $P_t$ derived by the calculating machine 14, is selected in a pulse selecting circuit 18 and a counter 19 and is passed through a gate 20. Accordingly, the pulses are controlled so as to have the derived quiescent interval $P_t$ and the pulse interval $\tau$. The pulses are then applied through an impressed voltage generating circuit 21 and the amplifier 11 to the transistors 7A, 7B ... 7N. The discharge is random; however it is possible to know whether the discharge is stable or not, by detecting the no-load time interval as stated above. As shown in FIG. 3A, by a predetermined function in the program, the quiescent time is decreased when the no-load time interval is wider than a predetermined value, while the quiescent time is increased when the no-load time interval is narrower than a predetermined value or is zero, whereby the working is stable and rapid.

Certain Examples showing functions in the program for practical control will now be illustrated.

EXAMPLE 1

A reference no-load time interval $K_0$ is chosen and a quiescent time interval is controlled so that the no-load time interval $K_t$ during the working is equal to $K_0$.

In FIG. 3A showing waveforms of voltage applied across the working gap, $K_t$, $\tau_0$, and $P_t$ respectively designate a no-load time interval, a discharge time interval and a quiescent time interval derived by a calculating machine. In order to set the values to the standard values of the no-load time interval $K_0$ and the discharge time interval $\tau_0$, as shown in FIG. 3B, the quiescent time interval was controlled. In FIG. 3A, the derived quiescent time interval $P_t$ and the quiescent time interval $P_{t-1}$ from the former pulse can be given by the equation $$P_t = P_{t-1} + \Delta P \qquad 1.$$
$$\Delta K = K_0 - K_t \qquad 2.$$
$$\Delta P = f(\Delta K) \cdot \tau_0 \qquad 3.$$

wherein $\Delta K$ represents a difference between the reference no-load time interval $K_0$ and the actual no-load time interval; and $\tau_0$ represents a discharge time interval. In the equation 3, $m = f(\Delta K)$ is shown in FIG. 4 as the following functions.
when $$N < K \leq K_0 \ldots m = \Delta K - N - M$$
$$-N \leq K \leq N \ldots m = -M \qquad 4.$$
$$\Delta K < -N \ldots m = \Delta K + N - M$$

In the equation 4, M and N respectively are the constants set at the programming and are positive or zero.

When the function is set, the quiescent time interval $P_t$ is developed from the various value $\Delta K$ as follows.

Certain changing conditions of the pulse are shown in FIG. 3A. When $N < \Delta K \leq K_0$, $O \leq K_t < K_0 - N$, an instruction for increasing the quiescent time interval is given. On the other hand, when $-N \leq \Delta K \leq N$, $K_0 - N \leq K_t \leq K_0 + N$, if $M = O$, an instruction maintaining the quiescent time interval is given and if $M > O$, an instruction gradually decreasing the quiescent time interval is given. Also, when $\Delta K < -N$: $K_0 + N < \tau_1$, an instruction for decreasing the quiescent time interval is given. In such a manner, the working is optimally and raidly performed according to the discharge condition.

EXAMPLE 2

A reference no-load time interval $K_0$ is set and a duty factor is changed so that the no-load time interval $K_t$ during the working approaches $K_0$. The duty factor D is then given by the following equation.

$$D = \frac{\text{discharge time interval } (\tau_0)}{\text{quiescent time interval } (P_t) + \text{discharge time interval } (\tau_0)}$$

In deciding a duty factor when considering the duty factor $D = D_{t+1}$ at the no-load time interval, $K = K_t$. After the sampling time $\Delta T$, the no-load time interval is changed to $K = K_{t+1}$.

The change from $K_t$ to $K_{t+1}$ by the duty factor $D_{1+t}$ is given by the equation $$\Delta K = K_{t+1} - K_t = \alpha D_{t+1} - \beta \qquad 5.$$

The factors $\alpha$ and $\beta$ can be easily obtained by 3 measurements of the no-load time interval and by 2 operations of the duty factor.

A straight line $\Delta K = f(D)$ is obtained by the 2 operations and the 3 measurements. The duty factor at $K = K_0$ is thus easily obtained from the straight line. On the other hand, when $K = K_t$, the duty factor for changing to $K_0$ can be obtained from the equation 5, by the following equation $$D_{t+1} = (K_0 - K_t + \beta)/(\alpha) \qquad 6.$$

Figure 5:
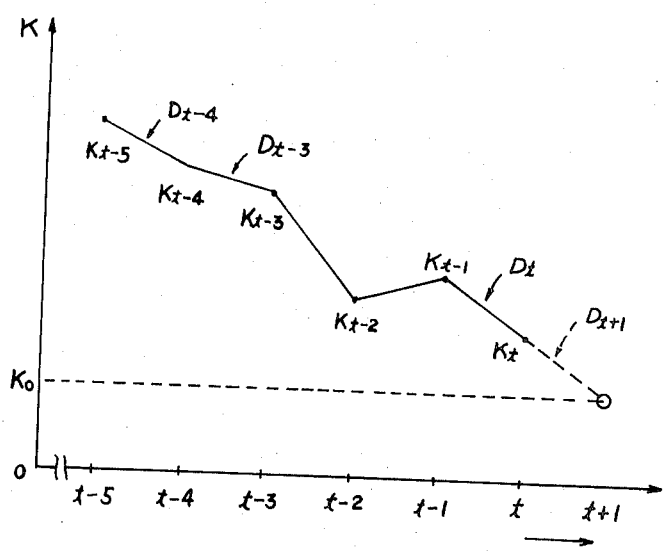
FIG. 5 is a graph comparing no-load voltage time interval with a duty factor as determined in Example 2.

The change of the no-load time interval $K_t$ as a function of the duty factor D is shown in FIG. 5. When the example is applied in practice, averages of several measurements of $\alpha$ and $\beta$ are given and the duty factor in a subsequent operation is determined. Accordingly, quiescent time interval $P_t$ given by the duty factor is derived. In accordance with the present invention, fine control of the quiescent time interval can be achieved, so that the working efficiency can be increased without arc discharge.

In the above two examples, the discharge time interval $\tau_0$ was considered to be a constant at a set value, however $\tau_0$ can be changed. In accordance with the above two examples, fine control can be performed; however the control apparatus is not simple. The following is an example of a preferred embodiment employing a simple control apparatus.

EXAMPLE 3

Figure 6:
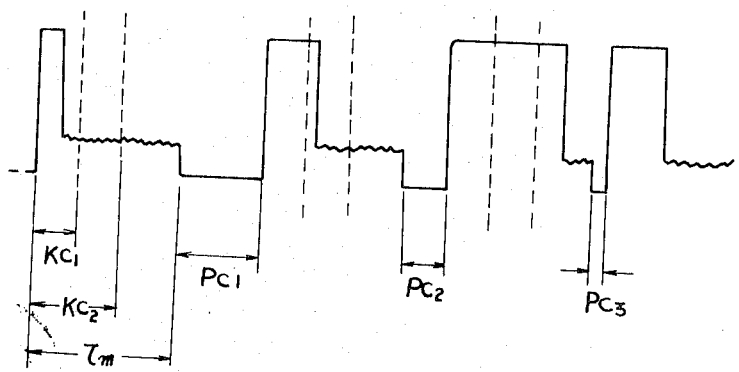
FIG. 6 is a waveform controlled by the method of Example 3.

In the control of the quiescent time interval as a function of the length of the no-load time interval, the applied voltage time is divided into 3 time intervals as shown in FIG. 6 wherein a time before applying voltage to the first time zone is designated as $Kc_1$ and a time before applying voltage to the second time zone is designated as $Kc_2$ and an applied voltage time is designated as $\tau_m$. The quiescent time interval is controlled as follows. When the no-load time interval is $O \leq K_t < Kc_1$, the quiescent time interval is controlled according to $Pc_1$. Similarly, when $Kc_1 \leq K_t < Kc_2$, the quiescent time interval is controlled according to $Pc_2$. Also, when $Kc_2 \leq K_t \leq \tau_m$, the quiescent time interval is controlled to $Pc_3$ wherein $Pc_1 > Pc_2 > Pc_3$. In accordance with the above control, when an arc discharge is caused, the quiescent time is increased. At the no-load time interval, no current is passed across the working gap, so that the no-load time can be considered to be a part of the quiescent time. Accordingly, when the no-load time interval is long, the next applied voltage can be given after a small quiescent time. Accordingly the working efficiency can be improved.

In accordance with the method and apparatus of the invention, the operation can be optimally performed without any manual adjustment of the quiescent time by an operator during the working operations after the initiation thereof. Accordingly, the results of the electrical discharge shaping do not depend upon the skill of an operator.

What is claimed as new and desired to be secured by Letters Patent of the United States is:

1. In a method for controlling an electrical discharge shaping by intermittently applying a discharge current pulse across a working gap with a quiescent time interval, the improvement which comprises the steps of detecting a no-load interval between discharge pulses before applying a voltage across the working gap to generate the discharge; and controlling said quiescent time interval as a function of said no-load time interval.

2. The method for controlling electrical discharge shaping according to claim 1 wherein a voltage waveform applied across the working gap is divided into a plurality of time intervals and the quiescent time interval is stepwise controlled by detecting the time interval including the quiescent time interval.

3. The method for controlling an electrical discharge shaping according to claim 1, wherein the quiescent time interval is changed and instructed by a pulse generating device as a predetermined function of no-load time interval before applying voltage across the working gap to generate the discharge.

4. The process for controlling an electrical discharge shaping according to claim 1, wherein the quiescent time is decreased when the no-load time interval before applying voltage across the working gap to generating discharge is wider than a predetermined value, and is increased when the no-load time interval is narrower than a predetermined value or is zero.

5. Apparatus for shaping a work piece by the application of intermittent electric voltage where there is a quiescent time interval between successive applications of discharge voltage pulses comprising:

means for impressing a voltage across a working gap between an electrode and a work piece, said voltage remaining at a no-load level until a substantial current flows in said working gap, timing means for measuring the time period during which said no-load voltage exists between discharge voltage pulses across said working gap, and control means coupled to said no-load voltage time measuring means for controlling the length of said quiescent time interval in response to the output from said no-load voltage time measuring means.

* * * * *